(12) United States Patent
Mumme et al.

(10) Patent No.: US 10,764,077 B2
(45) Date of Patent: Sep. 1, 2020

(54) CROWD-SOURCED EVENT IDENTIFICATION THAT MAINTAINS SOURCE PRIVACY

(71) Applicant: RAM Laboratories, Inc., San Diego, CA (US)

(72) Inventors: Dean C. Mumme, San Marcos, CA (US); Robert M. McGraw, Del Mar, CA (US); Richard A. MacDonald, San Diego, CA (US)

(73) Assignee: RAM Laboratories, Inc., San Diego, CA (US)

( * ) Notice: Subject to any disclaimer, the term of this patent is extended or adjusted under 35 U.S.C. 154(b) by 113 days.

(21) Appl. No.: 15/658,315

(22) Filed: Jul. 24, 2017

(65) Prior Publication Data

US 2018/0034654 A1    Feb. 1, 2018

Related U.S. Application Data

(60) Provisional application No. 62/366,890, filed on Jul. 26, 2016.

(51) Int. Cl.
| | |
|---|---|
| *H04L 12/18* | (2006.01) |
| *H04W 12/06* | (2009.01) |
| *H04W 12/02* | (2009.01) |
| *H04W 4/029* | (2018.01) |
| *G02B 25/00* | (2006.01) |

(52) U.S. Cl.
CPC .......... *H04L 12/1895* (2013.01); *G02B 25/00* (2013.01); *H04W 4/029* (2018.02); *H04W 12/02* (2013.01); *H04W 12/06* (2013.01)

(58) Field of Classification Search
CPC ...... G02B 25/00; H04L 12/1895; H04W 4/02; H04W 12/02; H04W 12/06; H04W 4/029
See application file for complete search history.

(56) References Cited

U.S. PATENT DOCUMENTS

| | | | |
|---|---|---|---|
| 9,147,336 B2 * | 9/2015 | Schultz | G08G 1/205 |
| 9,223,057 B1 * | 12/2015 | Uy | G01W 1/02 |
| 9,449,491 B2 * | 9/2016 | Sager | G06F 3/04842 |
| 9,516,052 B1 * | 12/2016 | Chauhan | G06F 16/248 |

(Continued)

*Primary Examiner* — James R Sheleheda
(74) *Attorney, Agent, or Firm* — Genius Patent APC; Bruce Hare

(57) ABSTRACT

An automated method that generates crowd-sourced event notifications includes: retrieving sensor data from mobile devices; detecting events based on the retrieved sensor data; and generating a set of summary nodes based on the events, where each summary node is associated with multiple events. A system that generates crowd-sourced event notifications includes: multiple mobile devices, each having at least one sensor, each mobile device identifies events using calculations based on sensor data and generates a notification for each identified event; and an analytics server that generates a set of summary nodes based on the identified events, each summary node associated with multiple events. An automated method that generates event notifications includes: retrieving sensor data; calculating a set of statistical values based on the sensor data; comparing the statistical values to at least one threshold; and generating an event notification when the threshold is exceeded by any of the statistical values.

5 Claims, 16 Drawing Sheets

(56) References Cited

U.S. PATENT DOCUMENTS

| | | | |
|---|---|---|---|
| 9,753,796 B2* | 9/2017 | Mahaffey | H04L 41/142 |
| 9,781,148 B2* | 10/2017 | Mahaffey | G06F 21/577 |
| 9,807,183 B2* | 10/2017 | Maguire | H04L 67/22 |
| 9,977,792 B2* | 5/2018 | Bell | H04W 4/50 |
| 10,051,349 B2* | 8/2018 | Schattmaier | H04Q 9/00 |
| 10,069,849 B2* | 9/2018 | Muddu | G06F 16/285 |
| 2004/0148500 A1* | 7/2004 | Olkin | H04L 51/30 713/150 |
| 2012/0016948 A1* | 1/2012 | Sinha | G06Q 10/10 709/207 |
| 2012/0065871 A1* | 3/2012 | Deshpande | G08G 1/0112 701/118 |
| 2013/0084882 A1* | 4/2013 | Khorashadi | H04W 4/021 455/456.1 |
| 2013/0275880 A1* | 10/2013 | Bachman | G06F 16/40 715/751 |
| 2014/0067487 A1* | 3/2014 | Assuncao | G06Q 99/00 705/12 |
| 2014/0358843 A1* | 12/2014 | Subramaniam | G06N 5/02 706/58 |
| 2014/0370844 A1* | 12/2014 | Lara | H04W 4/029 455/405 |
| 2015/0089399 A1* | 3/2015 | Megill | H04L 12/1813 715/753 |
| 2015/0317655 A1* | 11/2015 | Myers | G06Q 30/0205 705/7.34 |
| 2015/0325102 A1* | 11/2015 | Mondal | H04L 67/04 340/539.11 |
| 2015/0347478 A1* | 12/2015 | Tripathi | G06F 16/29 707/743 |
| 2016/0006723 A1* | 1/2016 | Wilson | H04L 63/0823 713/175 |
| 2016/0155073 A1* | 6/2016 | Augenstein | G06F 16/29 705/7.24 |
| 2016/0173963 A1* | 6/2016 | Filson | G05D 23/1902 340/870.09 |
| 2017/0005995 A1* | 1/2017 | Yang | H04L 63/062 |
| 2017/0034196 A1* | 2/2017 | Chauhan | H04L 63/1416 |
| 2017/0103420 A1* | 4/2017 | Ramasarma | G01S 19/39 |
| 2017/0186309 A1* | 6/2017 | Sager | G08B 27/001 |
| 2017/0191843 A1* | 7/2017 | Yadav | G01C 21/3461 |
| 2017/0229018 A1* | 8/2017 | Levy | G08G 1/148 |
| 2017/0302653 A1* | 10/2017 | Ortner | H04L 63/0435 |
| 2017/0344646 A1* | 11/2017 | Antonopoulos | H04L 63/0428 |
| 2018/0034654 A1* | 2/2018 | Mumme | H04W 12/06 |
| 2018/0053405 A1* | 2/2018 | de Azevedo | G08G 1/0112 |
| 2018/0081499 A1* | 3/2018 | Chugh | G06F 16/29 |
| 2018/0124166 A1* | 5/2018 | Zavesky | H04L 67/104 |
| 2018/0314390 A1* | 11/2018 | Bachman | G06F 3/0481 |
| 2018/0373733 A1* | 12/2018 | Andrew | H04L 67/18 |
| 2018/0375648 A1* | 12/2018 | Huang | H04L 63/0428 |
| 2019/0033463 A1* | 1/2019 | Ben-Moshe | G01S 19/21 |
| 2019/0097981 A1* | 3/2019 | Koyun | H04L 9/0822 |

* cited by examiner

CROWD-SOURCED EVENT IDENTIFICATION THAT MAINTAINS SOURCE PRIVACY

CROSS-REFERENCE TO RELATED APPLICATIONS

This application claims priority to U.S. Provisional Patent Application Ser. No. 62/366,890, filed on Jul. 26, 2016.

STATEMENT REGARDING FEDERALLY SPONSORED RESEARCH OR DEVELOPMENT

This invention was made with government support under HSHQDC-15-C-00020 awarded by Department of Homeland Security (DHS). The government has certain rights in the invention.

BACKGROUND

The ubiquitous nature of networked devices drives the size of networks populated by mobile devices and the Internet of Things (IoT) to larger and larger scales, resulting in the opportunity for analytics that use crowd-sourced sensor data produced by those devices to grow exponentially. Crowd-sourced data is obtained by enlisting the services of a number of people or devices, typically via the Internet. Challenges in using this crowd-sourced data, however, are that there are significant privacy concerns associated with individual sensors and/or sensor readings involving locations and individuals, and that an analytics server has to scale to handle large numbers of crowd-sourced events in short time windows.

Crowd-sourced analytics leverage data extracted by mobile device sensors residing on the IoT. Such analytics typically provide high-level, actionable information about environment events having natural or artificial cause based on crowd-sourced device sensor data. These analytics must be accurate in their assessments while also preserving the privacy of device owners. A key facet for crowd-source analytics is that they must be designed with privacy in mind and follow privacy by design (PbD) principles.

In order to provide privacy and end-to-end protection of crowd-sourced data, the designs must ensure data integrity, authentication, and non-repudiation of data. A common technique in providing this end-to-end protection is to use public key infrastructure (PKI) that utilizes keys generated from device identity for signing and encryption functions. While the use of PKI provides an effective tool for protecting data in motion, the sender's authentication process may result in that user/device losing its privacy in the event that an eavesdropper has access to the authenticating party due to the fact that the user's identity information is passed along with the message.

In addition to ensuring end-to-end protection of data through separate authentication and data processing processes, analytics design must respect privacy principles. Polling processes typically associated with mobile device sensor-driven event generation and reporting typically provide constant or consistent position and sensor data updates. If a bad actor gains access to the analytics processing site or storage, the crowd-sourced data arising from these processes can be assembled into tracks for the mobile device and used to subvert the user's privacy by identifying all the locations to which the user traveled, or the sensor data profile for the physical environment in which the user is situated.

Current methods for ensuring privacy in crowd-sourced analytics have focused on encrypting data-in-transit between the mobile device and the analytics processing and encrypting data-at-rest at the analytics processing site. These methods could be subject to subversion in the event an adversary gains access to storage at the analytics processing site.

One method to alleviate this problem is the use of random identifiers. Using random identifiers, the vehicle tracks can be identified but the randomization process keeps that information from being quickly correlated with a specific user.

Another current method uses the concept of interrupt based virtual trip lines to abstract location data on the mobile device side. This technique applies to traffic analysis, but is lacking in cases when concerned with clusters of behaviors or phenomena dispersed about a given region.

Therefore there exists a need for a solution that separates user identity information from event reporting and acquires, abstracts, and processes the crowd-sourced data in a better manner that further suppresses privacy information while scaling to handle large numbers of event notifications (event storms) in a short period of time.

SUMMARY

Some embodiments may provide ways to monitor connected mobile devices in order to identify events. The mobile devices may include, for instance, smartphones, tablets, internet of things (IoT) devices, and/or other devices that are able to connect to a network.

Each mobile device may have one or more associated sensors. Such sensors may include, for instance, location sensors (e.g., global positioning system or GPS sensors), environmental sensors (e.g., sensors associated with temperature, elevation, barometric pressure, humidity, etc.), and/or other appropriate sensors.

Each mobile device may sample the sensors at regular intervals to obtain data. Various calculations may be performed on the sensor data. Such calculations may include, for instance, generating statistical values such as average (mean and/or median), standard deviation and/or variance, minimum, maximum, rate of change, etc. Each value may be calculated based on a rolling window that includes a specified number of samples (and/or other appropriate criteria such as samples retrieved within a specified time limit, regardless of total number).

The calculated values may be compared to various thresholds in order to identify events. Such events may be defined by single thresholds, multiple exceeded thresholds, and/or other appropriate criteria. If an event is identified, the mobile device may generate a notification and send the notification to an analytics server.

The notification may be sent using a two-part process that decouples identifying information from event information. The two-part process may involve validating the identity of a mobile device at an identity module or server associated with the analytics server and retrieving the event notification information at an analytics module associated with the analytics server.

The analytics server may generate a set of summary nodes based on the received notifications. Each summary node may be associated with multiple event notifications. The summary nodes may typically include location information (e.g., geographic location, grid coordinates, etc.) and/or other information related to the event notifications (e.g., number of notifications, sensor data including mean and standard deviation, etc.).

The set of summary nodes may be generated using k-medoid clustering. Some embodiments may randomly generate a set of centroids and associated the event notifications with the nearest centroid. The distance of each notification to the associated centroid may be summed. In some embodiments, additional sets of centroids may be randomly generated and the distance recalculated until no reduction in total distance is achieved.

Some embodiments may identify physical features such as geographic features (e.g., shorelines, rivers, etc.), structures (e.g., buildings, bridges, barriers, etc.), roadways, and/or other appropriate physical features. Such features may be identified by analyzing the summary nodes. Some embodiments may associate the physical features with the summary nodes.

The summary nodes may be associated with a specified region. Such a region may be divided into a number of equally sized cells. Such division may be based on various appropriate criteria (e.g., target number of nodes associated with each cell). Some of the cells may be subdivided to include multiple sub-cells. Such sub-division may be used to limit a number of nodes (and/or associated number of devices) included in each sub-cell.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

Figure 1:
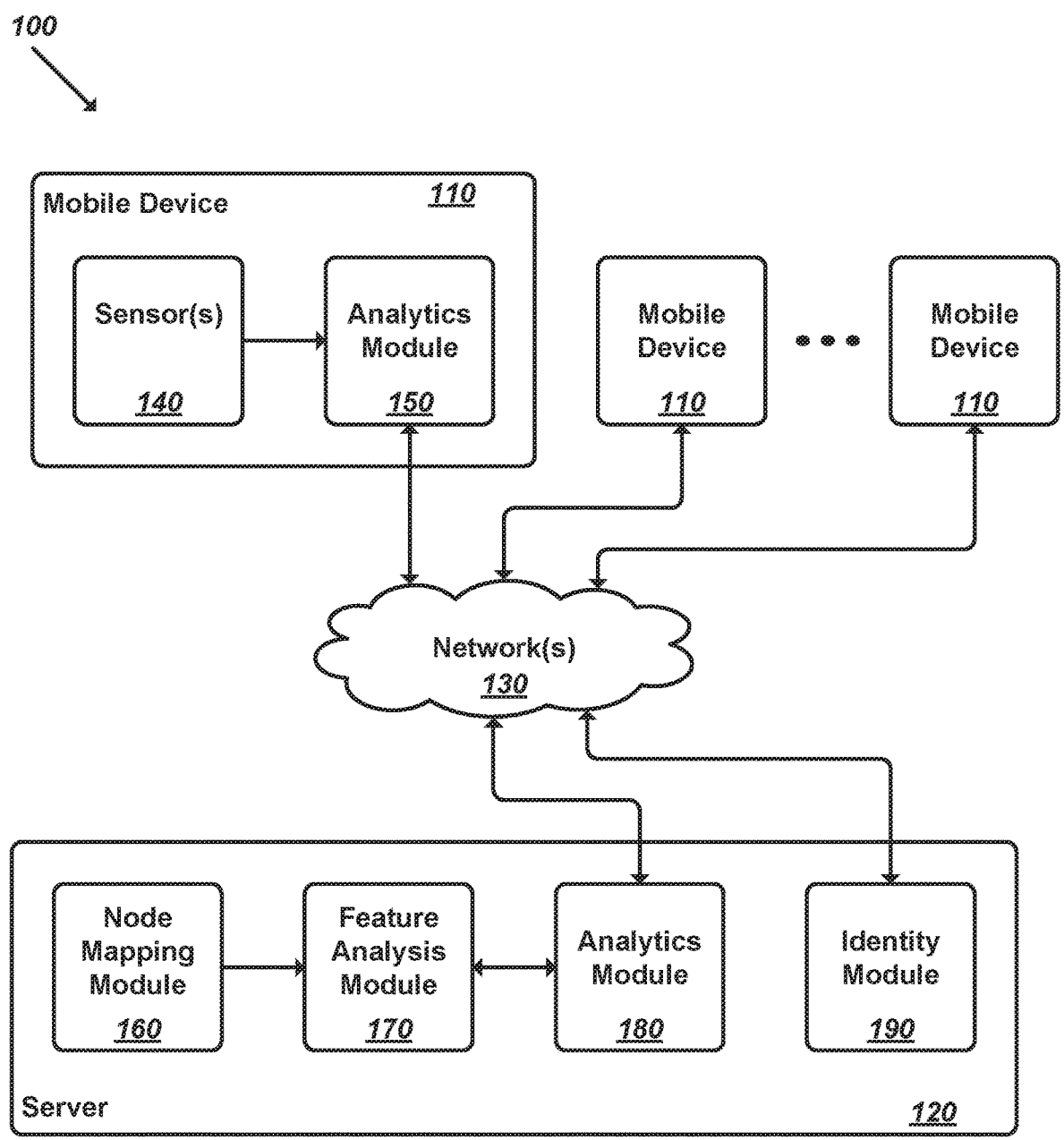
FIG. 1 illustrates a schematic block diagram of a crowd-sourced event identification system according to an exemplary embodiment.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways for ensuring privacy while utilizing analytics operating upon crowd-sourced mobile device data.

Some embodiments may sense data at a mobile device, generate derived data for event notifications, send messages for analytics processing, perform privacy-based clustering analytics using summary nodes, and perform privacy-based multi-resolution clustering analytics.

Sensing data at the mobile device may involve continual extraction of mobile device sensor data and storage at the mobile device.

Generating derived data for event notifications may involve real-time derivation of data in the form of moving time window averages, rate of change computations, minimum computations and maximum computations for on-device analytics.

Sending messages for analytics processing messaging between the mobile device and the cloud may use a two-step authentication and messaging process. Such a technique de-couples the data processing and authentication steps being performed by the mobile device. In this event, the method utilizes an authentication based proxy server for connecting to the device, and a second analytics server for handling receipt of the message.

Performing privacy-based clustering analytics may involve preserving clustering through the use of summary nodes upon receipt of device sensor data at a server. Each summary node may represent a geographically located cluster of a statistically significant number of devices. For each sensor type, sensor event notifications may be summarized as a mean and standard deviation for the cluster. This may also be done for derived data that generate event notifications through on-device analytics. For example, acceleration, location, and pressure data may each be summarized in this way, and the summary node may render this data to the downstream analysis stages, thereby obscuring individual data values.

Performing privacy-based multi-resolution clustering analytics may involve using multi-resolution clustering analytics to granulize location reports. A multi-resolution grid (multi-grid) may be constructed so that areas of high device density are divided into smaller latitude-longitude "cells" and areas of low device density are divided into larger cells. This allows each cell to include a statistically significant number of devices without over-gridding sparsely populated areas and such an approach is able to scale to handle event storms in heavily populated areas.

In combination with multi-grids, a pattern detection algorithm may be applied to detect curvilinear shapes within the locations of the reporting nodes with the objective of "organic" detection of features and boundaries that characterize devices experiencing anomalous sensor values. This leads to the use of geological features to get the same or better information. Summary nodes may also be classified according to their proximity to (or location within) various geological structures of interest for detection of events.

Some embodiments provide a method including: receiving sensed data at multiple mobile devices; performing on-device analytics over time to abstract specific mobile device sensor data at a given point in time; using thresholds on the on-device analytic data to generate notifications; conducting a de-coupled two-way authentication process between each mobile device from the plurality of mobile devices and a plurality of cloud-analytics services; identifying summary nodes for crowd-sourced data from multiple mobile devices using clustering methods; employing multi-resolution grid-cell clustering analytics to develop actionable data while further preserving privacy of the mobile device and scale to handle event storms; and employing geo-feature classification to identify actionable events that are associated with geographical features.

Some embodiments may utilize moving time windows and perform calculations over the window in order to prevent mobile device tracks including specific data and time tuples. Such calculations may include averages, rate of change, minimum, maximum, etc. The calculated values may be compared to threshold values in order to detect events and generate notifications. Such event notifications may abstract data and time tracks of the mobile device.

A two-way authentication process between mobile devices and the cloud analytics server may be used in order to separate identity and mobile device sensor data to ensure anonymity. Identity authentication may be performed between the mobile device and an identity server at the cloud analytics server. Authenticated messaging of data between the mobile device and the cloud analytics server at a crowd-sourced analytics server may be used after identity authentication.

Analytics that identify summary nodes at the crowd-sourced analytics server may be used to abstract data through summarizing multiple data points as a single node to ensure mobile device privacy and anonymity. Some embodiments may use k-medoid clustering techniques at the crowd-sourced analytics server to generate the summary nodes.

Some embodiments may provide multi-resolution grid-cell clustering at a crowd-sourced analytics server to subdivide cells to smaller regions to be able to scale in order to process crowd-sourced event storms.

Geo-feature classification methods may be used to associate actionable events with geographical features.

Some embodiments may provide a crowd sourced event notification system including: multiple mobile devices; sensors on each mobile device; on-device analytics on each mobile device that perform moving window calculations to abstract specific mobile device data/time measurements; on-device analytics on each mobile device that generate events when certain moving window calculation thresholds are met; and a cloud analytics server.

The cloud analytics server may include an identity server and a crowd-sourced analytics server. The crowd sourced analytics server may include summary node analytics and multi-resolution/geo-feature analytics.

A first exemplary embodiment provides an automated method that generates crowd-sourced event notifications. The method includes: retrieving sensor data from a plurality of mobile devices; detecting a plurality of events based on the retrieved sensor data; and generating a set of summary nodes based at least partly on the plurality of events, wherein each summary node in the set of summary nodes is associated with multiple events from the plurality of events.

A second exemplary embodiment provides a system that generates crowd-sourced event notifications. The system includes: a plurality of mobile devices, each mobile device having at least one sensor, each mobile device identifies events using calculations based on data from the at least one sensor and generates a notification for each identified event; and an analytics server that generates a set of summary nodes based at least partly on the identified events, wherein each summary node in the set of summary nodes is associated with a plurality of events from the identified events.

A third exemplary embodiment provides an automated method that generates event notifications. The method includes: retrieving, at a mobile device, sensor data from at least one sensor associated with the mobile device; calculating a set of statistical values based on the sensor data; comparing the set of statistical values to at least one threshold; and generating an event notification when the at least one threshold is exceeded by any statistical value from the set of statistical values.

Several more detailed embodiments are described in the sections below. Section I provides a description of a system architecture of some embodiments. Section II then describes data collection and analysis performed by some embodiments. Next, Section III describes various methods of operation used by some embodiments. Lastly, Section IV describes a computer system which implements some of the embodiments.

I. System Architecture

FIG. 1 illustrates a schematic block diagram of a crowd-sourced event identification system 100 according to an exemplary embodiment. As shown, the system may include multiple mobile devices 110, at least one cloud analytics server 0120, and at least one network 130 or other communication pathway.

Each mobile device 110 (or "user device", or "source") may include a set of sensors 140 and an analytics module 150. Each mobile device 110 may be an electronic device such as a smartphone, tablet, laptop, wearable device, IoT device, etc. Such a device may allow communication across one or more networks 130.

The set of sensors 140 may include various sensors the device 110, such as location sensors (e.g., global positioning system or GPS sensors), motion or position sensors (e.g., accelerometers, gyroscopes, etc.), environmental sensors (e.g., temperature, humidity, elevation, etc.), etc.

The analytics module 150 may analyze data received from the sensors 140 in order to identify events. The on-device analytics module 150 may utilize a number of analytical techniques that abstract sensor information and timestamps to prohibit the generation of tracks for the mobile device 110. The analytics module 150 will be described in more detail in reference to system 200 below.

The server 120 may include a node mapping module 160, a feature analysis module 170, an analytics module 180, and an identity module 190. The server 120 may include one or more electronic devices that may be distributed across multiple locations. The server may be able to communicate across network 130, execute instructions and/or otherwise process data, and store or retrieve data using one or more local and/or remote storages.

The node mapping module 160 may generate summary node maps based on notifications received from the mobile devices 110. The module 160 may group node reports (e.g., event notifications) into summary nodes to further thwart track generation and ensure anonymity and privacy of mobile device 110. Such node generation will be described in more detail in reference to process 1300.

The feature analysis module 170 may analyze summary nodes generated by the mapping module 160 in order to identify physical features of an area, such as geographic features (e.g., a shoreline), structures (e.g., buildings, barriers, etc.), roadways, and/or other features.

The module 170 may be able to divide a region into a number of cells. Some of the cells may be further divided into sub-cells based on various relevant criteria (e.g., clustering of nodes, total number of users within a proximity of each other, etc.). The sub-cells may be further divided, as appropriate. Such division may allow multi-resolution provision of data with increased resolution associated with areas of interest, as defined by the cells and sub-cells. Such multi-resolution clustering and feature analytics may be performed to generate actionable data while scaling to handle event storms.

The analytics module 180 may be able to receive and/or retrieve notifications from the mobile devices 110. In addition, the analytics module 180 may interact with and/or direct the operations of the node mapping module 160 and the feature analytics module 170. The analytics module 180 may further analyze summary node and physical feature information to identify events, generate responses to the events, and/or provide analytic information to users.

The identity module 190 may be able to validate user identity in order to receive notifications from user devices 110. For privacy reasons, the identification validation may be performed by a separate entity than the analytics. In this example, the analytics modules 160-180 and the identity module 190 are represented as being on a single server 120. Different embodiments may divide the modules among distinct physical devices. The identity module 190 may validate each mobile device 110 (and/or notification received therefrom) in order to identify the various information sources 110 associated with incoming data. The module 190 may then strip identifying information before forwarding the notification to the analytics module 180 in order to maintain source privacy.

The networks 130 may include one or more local and/or distributed networks (e.g., Wi-Fi, Ethernet, cellular, the Internet, etc.). Such networks may allow communication between the server 120 and the user devices 110 using various messaging algorithms.

Figure 2:
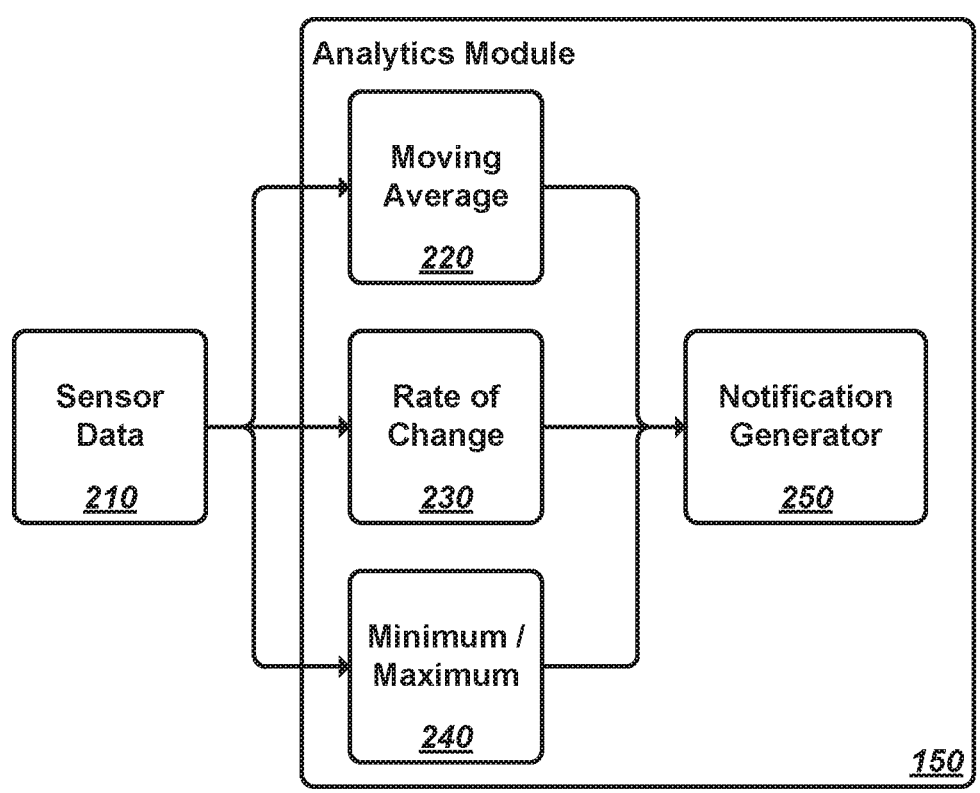
FIG. 2 illustrates a schematic block diagram of a system including an analytics module of the system of FIG. 1.

FIG. 2 illustrates a schematic block diagram of a system 200 including the analytics module 150 of system 100. As shown, the system may include sensor data 210, a moving average module 220, a rate of change module 230, a minimum/maximum module 240, and a notification generator 250.

The sensor data 210 may include analog and/or discrete signals received from the sensors 140. Such data may include location information, environmental information, etc. provided by on-board sensors of device 110. In some embodiments, such sensor data 210 may also include information such as, for example, information retrieved from a network source (e.g., map data), information related to device communications (e.g., network type and/or identity, cell tower identity, etc.), and/or other appropriate information that may be available to the device 110.

The moving average module 220 may calculate one or more average values based on the received sensor data 210. The average values may be moving averages (e.g., an average limited to a specified number of recent samples).

The rate of change module 230 may determine one or more rates of change based on the received sensor data 210. The rates of change may be associated with specified numbers of samples (e.g., based on the two most recent samples, based on average change over three or more samples, etc.).

The minimum/maximum module 240 may calculate minimum, maximum, and/or other appropriate values based on the received sensor data 210. Such values may be associated with a particular number of recent samples.

Different embodiments may include various other calculation modules than those described above (e.g., a standard deviation module, a sample count module, etc.).

The notification generator 250 may analyze the data received from calculation modules 220-240 in order to identify events. Such analysis may include, for instance, comparison of the received data to various threshold values. If an event is identified, the notification generator 250 may further generate and send a notification message to the server 120, where such message may be sent using a two-part process that separates identity validation from data collection.

One of ordinary skill in the art will recognize that the systems 100 and 200 described above may be implemented in various different ways without departing from the scope of the disclosure. For instance, some embodiments may combine multiple modules into a macro module. As another example, some embodiments may divide single modules into multiple sub-modules. In addition, the elements may be arranged in various different ways with various different communication pathways.

II. Data Collection and Analysis

Figure 3:
FIG. 3 illustrates a data chart that includes a set of summary nodes and physical features associated with a monitored region of some embodiments.

FIG. 3 illustrates a data chart 300 that includes a set of summary nodes 310 and physical features 320-350 (or "summarizer entities") associated with a monitored region of some embodiments.

Each summary node 310 may represent a geographically located cluster of a statistically significant number of devices (e.g., twenty, thirty, fifty, etc.). For each mobile device sensor type, the event notifications may be summarized as a mean and standard deviation using a clustering method, such as k-medoid. Each summary node may render this data to the downstream analysis stages, thereby obscuring individual data values. Special types of summary nodes (and/or other representations) may indicate population centers such as geographical features 320, buildings 330, roadways 340, boundaries 350, etc.

Figure 4A:
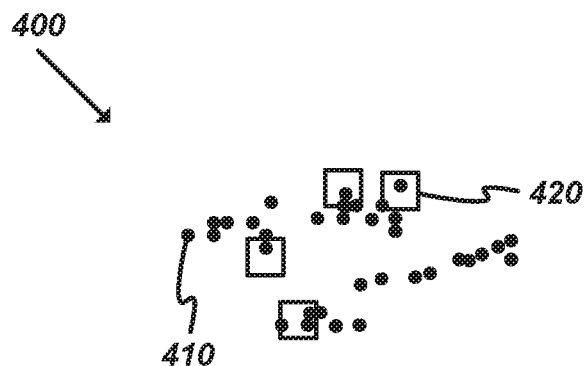
FIG. 4A-FIG. 4C illustrate data charts of a set of data points and sets of centroids used by some embodiments to generate the set of summary nodes.
Figure 4B:
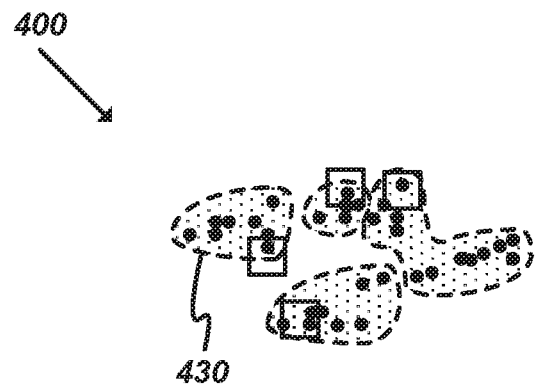
Figure 4C:
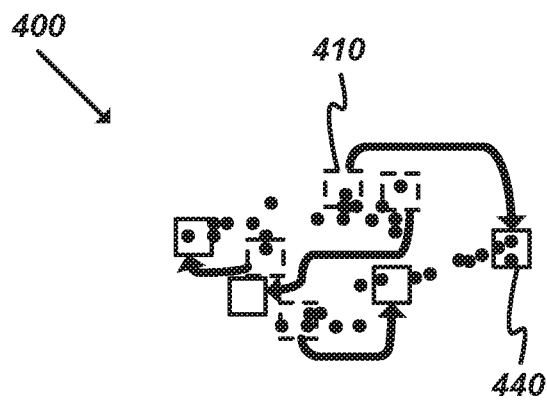

FIG. 4A-FIG. 4C illustrate data charts 400 of a set of data points 410 and sets of centroids (or "medoids") 420, 440 used by some embodiments to generate the set of summary nodes.

In FIG. 4A, a first set of medoids 420 may be randomly selected. In FIG. 4B, each data point 410 may be associated with the nearest medoid 420, as indicated by the shaded regions 430. In FIG. 4C, each medoid 420 is swapped with a different randomly selected medoid 440.

For each set of medoids 420, a sum of distances to each point may be calculated. If a newly selected set of medoids results in a reduced total distance, the process is continued until a minimum total distance is calculated. Such operations will be described in more detail in reference to process 1300 below.

Figure 5:
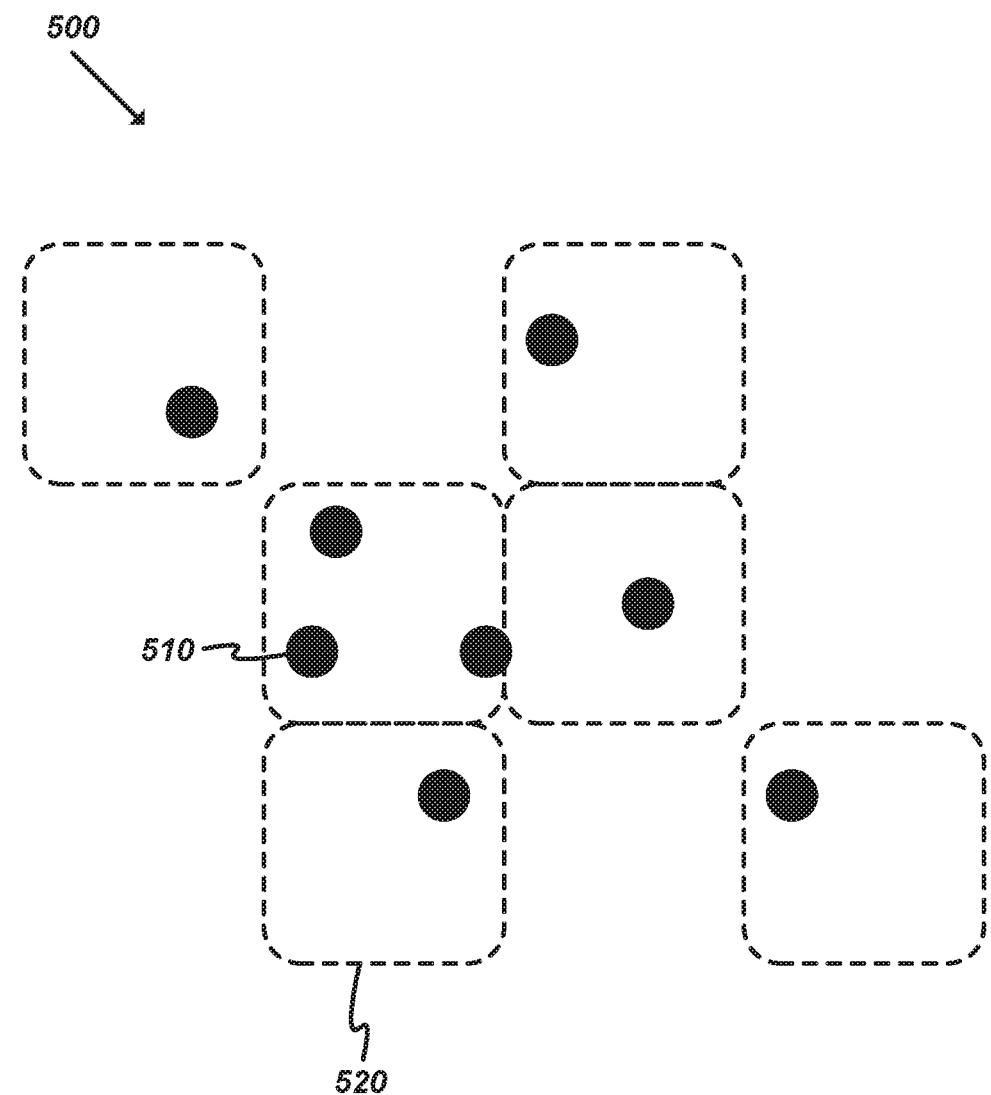
FIG. 5 illustrates a data chart that includes a set of summary node reports and a set of cells generated by some embodiments.

FIG. 5 illustrates a data chart 500 that includes a set of summary node reports 510 and a set of cells 520 generated by some embodiments.

Figure 6:
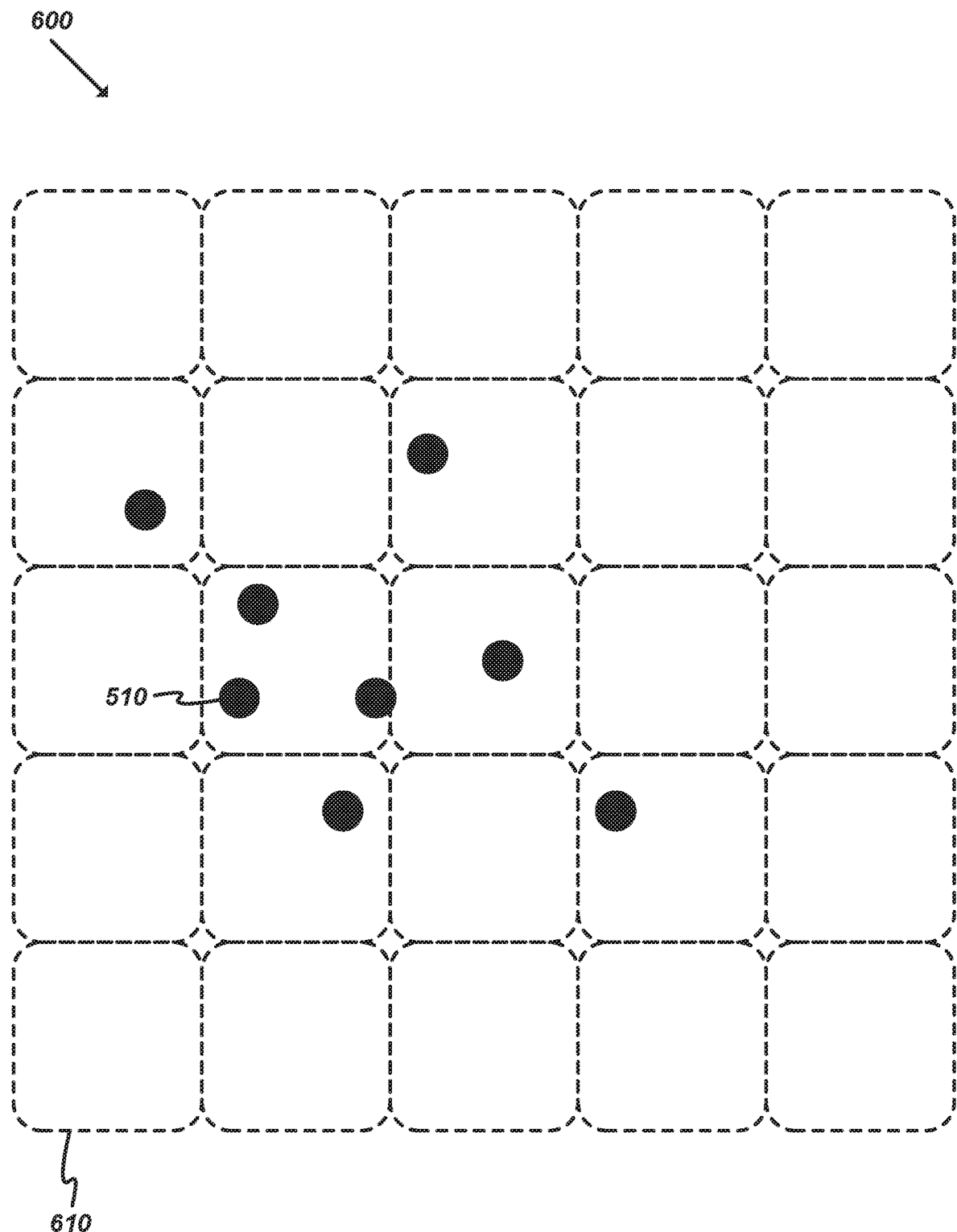
FIG. 6 illustrates a data chart that includes the set of summary node reports of FIG. 5 and another set of cells generated by some embodiments.

FIG. 6 illustrates a data chart 600 that includes the set of summary node reports 510 and another set of cells 610 generated by some embodiments.

In this example, the cells 520 are associated with regions that match the regions associated with cells 610 and the set of points 510 represented in charts 500 and 600 are the same.

Figure 7:
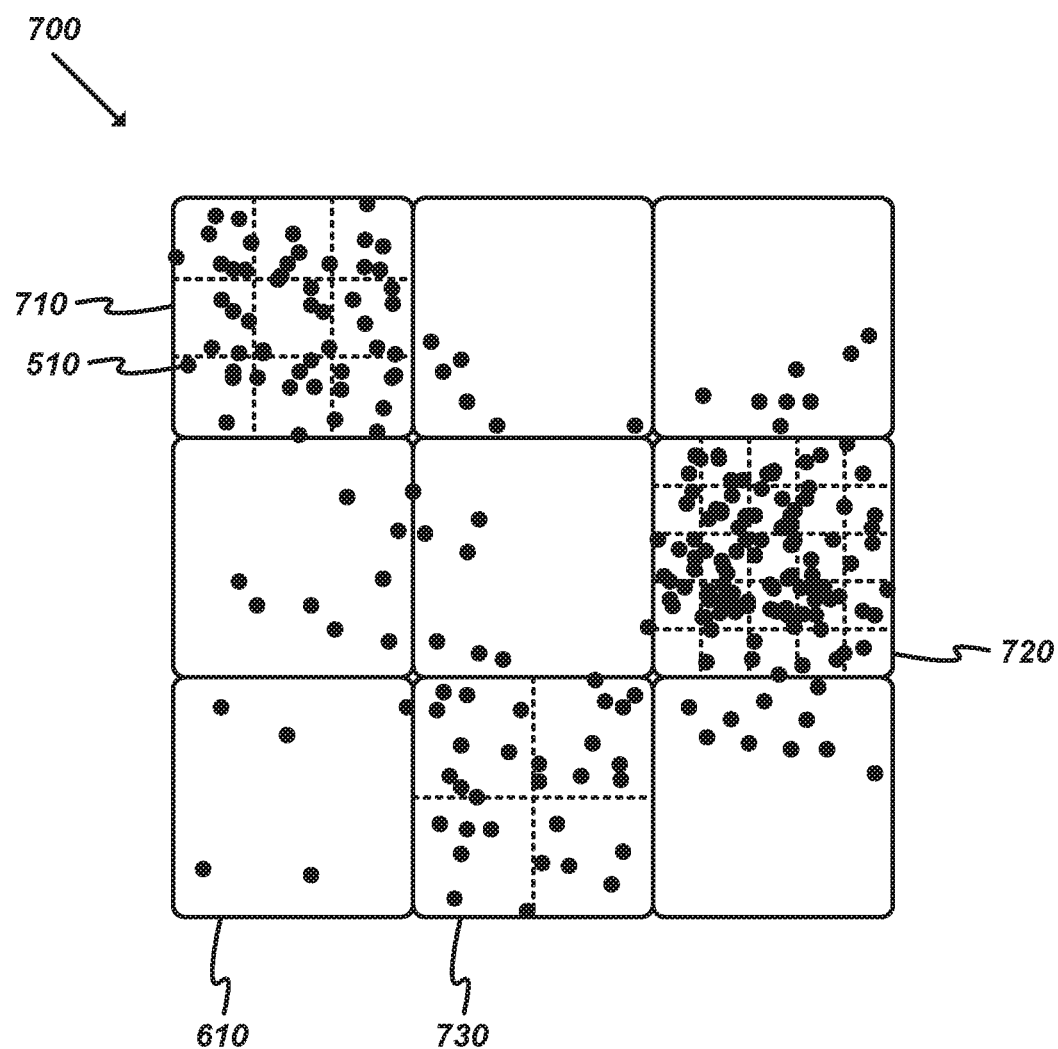
FIG. 7 illustrates a data chart that includes sets of cells and sub-cells generated by some embodiments.

FIG. 7 illustrates a data chart 700 that includes sets of cells 610 and sub-cells 710-730 generated by some embodiments. Such cells 610 and sub-cells 710-730 may allow multi-resolution analytics to be performed.

The cells 610 and sub-cells 710-730 may be defined in various appropriate ways. In this example, square cells 610 and sub-cells 710-730 are used. Different embodiments may include different cell shapes.

In this example, sub cells 710 include nine sub-cells associated with the original cell 610, sub-cells 720 include twenty-five sub-cells associated with the original cell 610, and sub-cells 730 include four sub-cells associated with the original cell 610.

Figure 8:
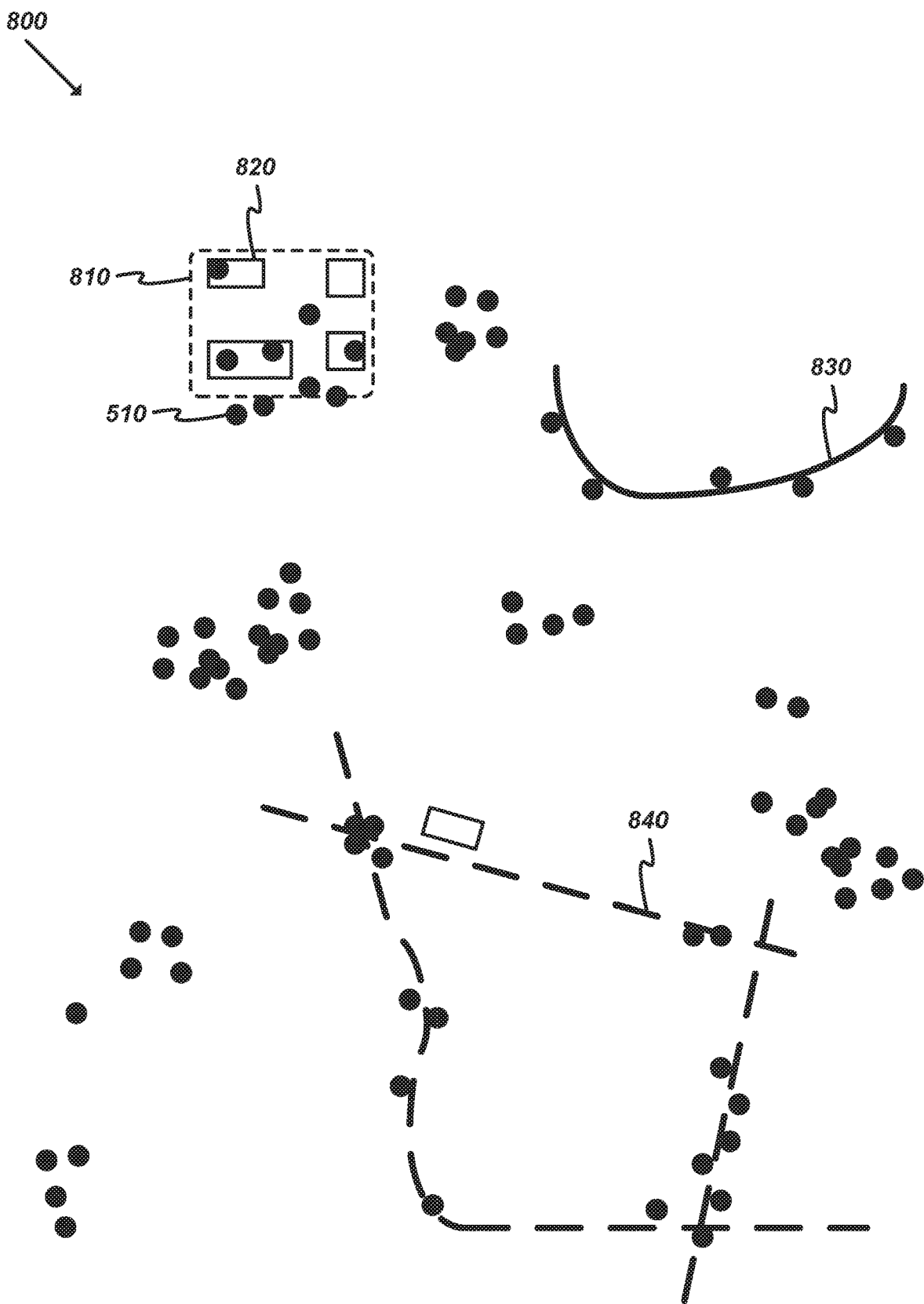
FIG. 8 illustrates a data chart that includes various physical features identified by some embodiments.

FIG. 8 illustrates a data chart 800 that includes various physical features 810-840 identified by some embodiments. Such features may be determined by analyzing the locations of the points 510. Some embodiments may utilize external resources (e.g., map data) when identifying some features.

This example includes a campus or business park 810, buildings 820, a geographic feature such as a shoreline 830, and several roadways 840.

Figure 9:
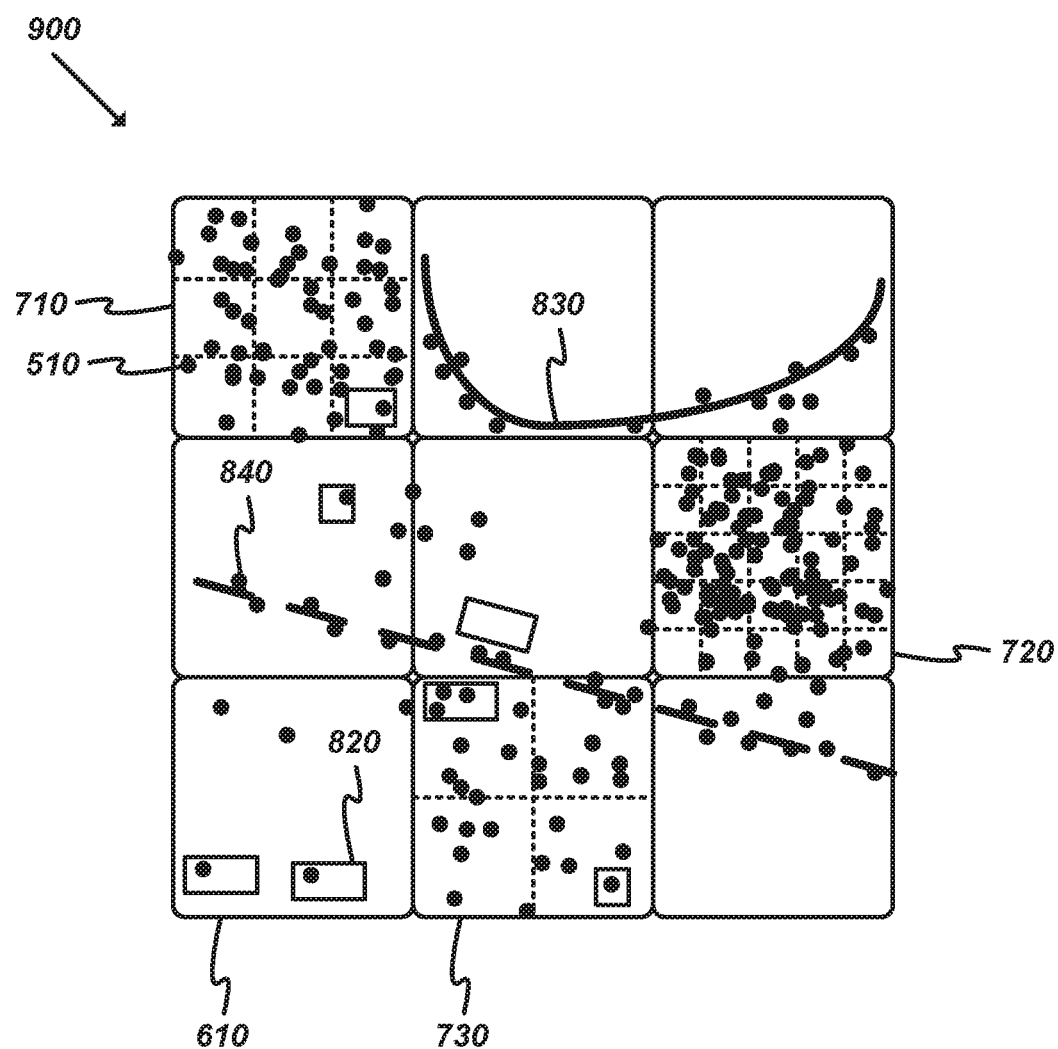
FIG. 9 illustrates a data chart that includes various physical features identified by some embodiments and sets of cells and sub-cells generated by some embodiments.

FIG. 9 illustrates a data chart 900 that includes various physical features 820-840 identified by some embodiments and sets of cells 610 and sub-cells 710-730 generated by some embodiments. This example shows the combination of summary node k-medoid clustering, multi-resolution clustering, and geo-feature based clustering that provides robust analysis capability to associated affected crowd-sourced mobile device data and summary nodes to specific events and geographical features while preserving the anonymity and privacy of the mobile devices. The set of points 510 in chart 900 includes the same points as chart 700.

Analytics information may be provided at various resolutions. Sub cells 710, for example, could be selected such that the sub-cells expand to consume the entire area of chart 900.

One of ordinary skill in the art will recognize that the data charts 300-900 may are exemplary and that different embodiments may include other charts that diverge in various ways.

For instance, different elements may be represented using different graphical elements than shown, which may include various shapes, colors, fill patterns, etc. that are able to provide differentiation among the elements.

III. Methods of Operation

Figure 10:
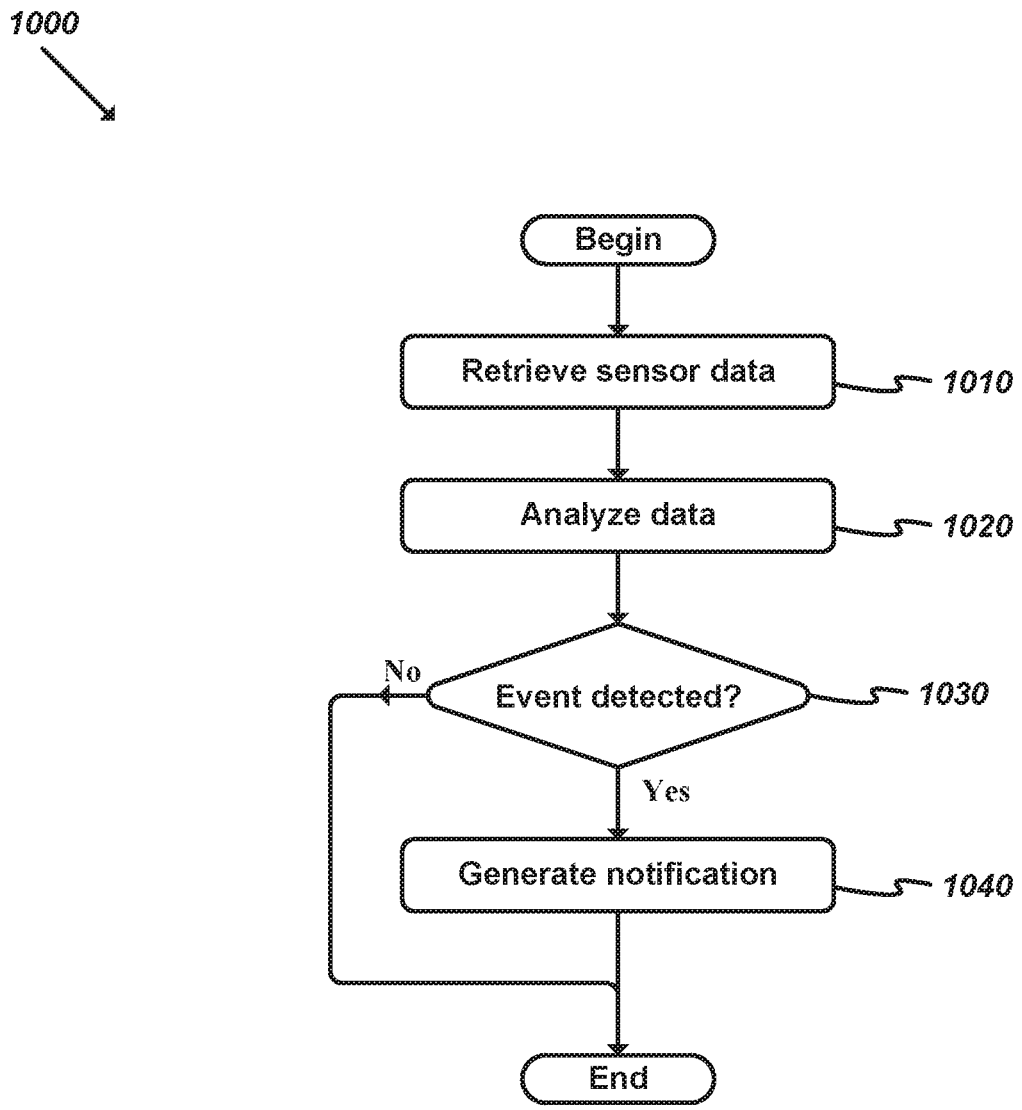
FIG. 10 illustrates a flow chart of an exemplary process that analyzes sensor data in order to detect events and generate notifications.

FIG. 10 illustrates a flow chart of an exemplary process 1000 that analyzes sensor data in order to detect events and generate notifications. Such a process may begin, for instance, when a mobile device 110 is powered on, when a mobile device application of some embodiments is launched, when network connectivity is available, and/or other under appropriate conditions. The process may be executed by an element such as mobile device 110. The process 1000 may have a complementary process executed by a device such as server 120.

As shown, the process may retrieve (at 1010) sensor data. Such sensor data may be retrieved or extracted from sensors such as sensors 140 described above. The sensor data may be retrieved by an element such as analytics module 150. Some embodiments may allow users to select sensor information to be made available for retrieval and/or other participation parameters (e.g., times of day when data may be collected). Some embodiments may allow administrative users (e.g., users associated with event monitoring) to define the sensor data to be collected and/or analyzed.

Next, the process may analyze (at 1020) the retrieved data at the mobile device 110. Such analysis may utilize elements such as calculation modules 220-240. Calculation of moving average, rate of change, minimum and/or maximum, and/or other appropriate calculations may be performed in parallel.

Process 1000 may then determine (at 1030) whether an event has been detected. Such determination may be made by an element such as notification generator 250. The determination may be based on various relevant factors. For instance, some embodiments may compare values provided by the calculation modules 220-240 to a set (or sets) of threshold values. If one or more values exceeds a threshold value, an event may be detected.

Some embodiments may further define events using additional comparisons. For instance, an event type may be associated with a particular threshold value or a set of threshold values. Received data that exceeds the set of threshold values may be associated with a first event type, while data that exceeds only a particular threshold may be associated with a second event type.

If the process determines (at 1030) that no event has been detected, the process may end. If the process determines (at 1030) that an event has been detected, the process may generate (at 1040) a notification and then may end.

Generation of the notification may include generating and sending a message (or set of messages) from the mobile device 110 to a device such as server 120. The message may include information such as event type, timestamp, location, etc. Some embodiments may utilize two-part authentication and associated messaging.

Figure 11:
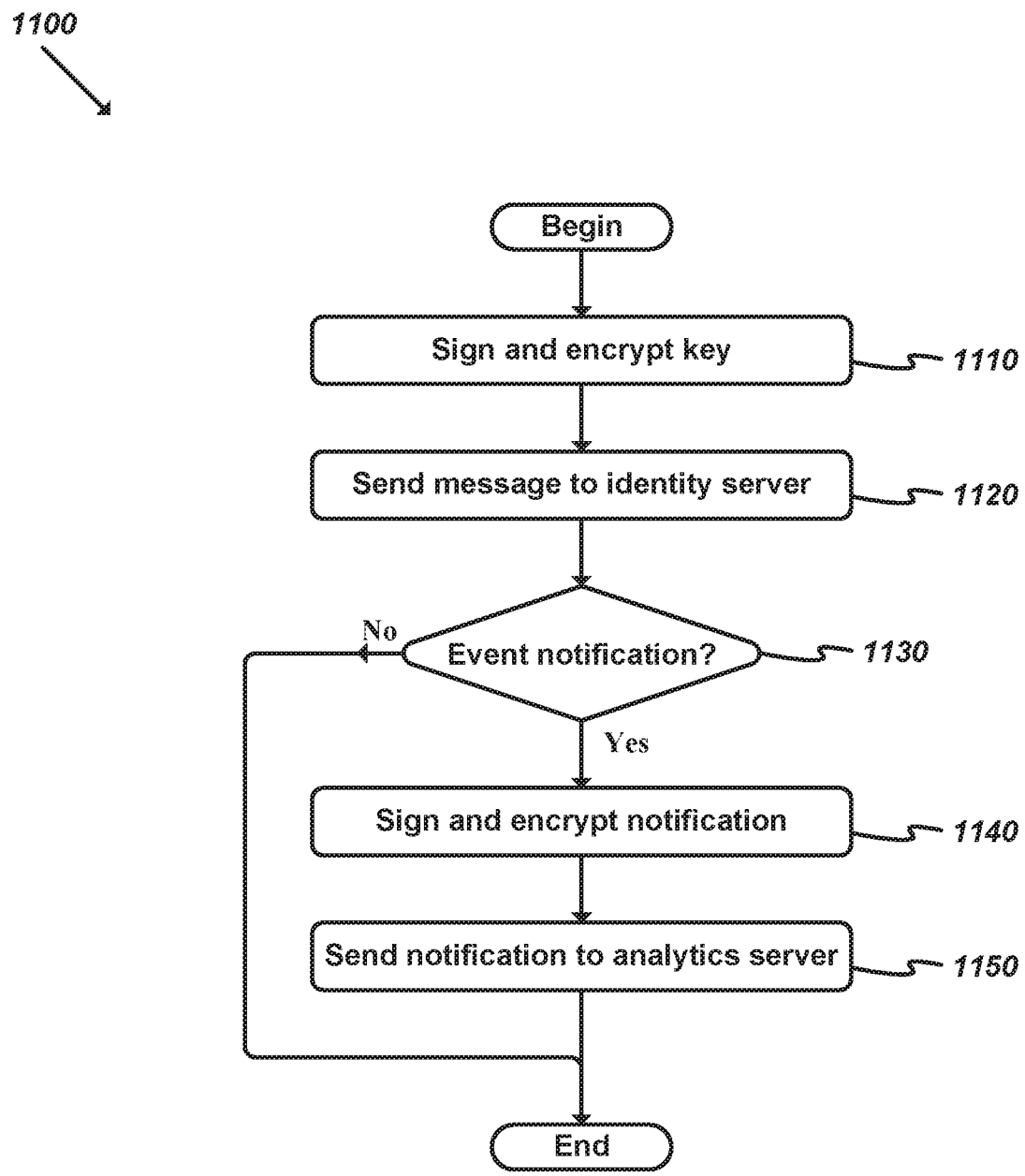
FIG. 11 illustrates a flow chart of an exemplary process that uses two-part communications to maintain user privacy.

FIG. 11 illustrates a flow chart of an exemplary process 1100 that uses two-part communications to maintain user privacy. The process may conduct two-way authentication to ensure mobile device identity remains private at the cloud analytics server 120 by decoupling the sending of identity and notification information to the server 120.

As mentioned above, a key challenge for PbD is to ensure end-to-end protection of data. End-to-end protection of data is typically accomplished by PKI solutions that encrypt data based on sender identity. While encrypting the data may achieve this goal, the association of the sender identity with corresponding mobile device sensor data at the cloud analytics server 120 may result in the potential generation of mobile device tracks if the cloud analytics server is subverted.

Process 1100 may begin, for instance, when a user device is powered on, when an application of some embodiments is launched, and/or under other appropriate conditions. The process may be executed by an element such as mobile device 110. The process 1100 may have a complementary process executed by a device such as server 120.

As shown, the process may sign and encrypt (at 1110) a key and send (at 1120) a message to the server 120 (specifically, to identity module 190), where the message includes the encrypted key. The identity server 190 may receive the message and decrypt the key.

Process 1100 may then determine (at 1130) whether an event notification should be generated. Such a determination may be based on the analysis performed at operation 1030 above. If the process determines (at 1130) that no event notification should be generated, the process may end.

If the process determines (at 1130) that an event notification should be generated, the process may sign and encrypt (at 1140) the notification, send (at 1150) the notification to the analytics server 120 (specifically to analytics module 180), and then end. The analytics server 180 may receive the notification and validate, decrypt, and store the data.

Figure 12:
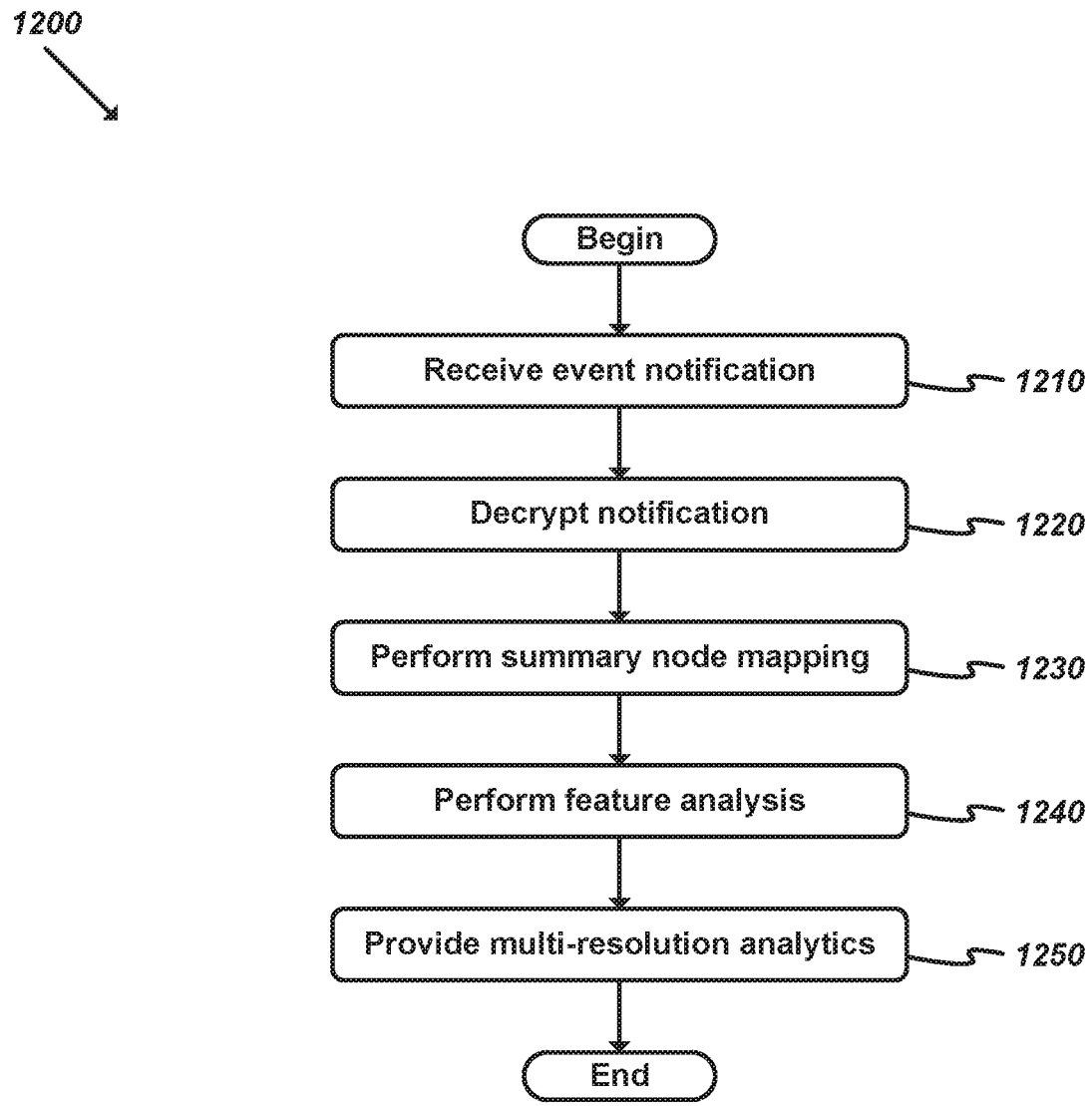
FIG. 12 illustrates a flow chart of an exemplary process that collects and analyzes event notifications from multiple user devices.

FIG. 12 illustrates a flow chart of an exemplary process 1200 that collects and analyzes event notifications from multiple user devices 110. Such a process may begin, for instance, when a server 120 of some embodiments is powered on, when a server-side application of some embodiments is launched, and/or under other appropriate conditions. The process may be executed by an element such as server 120. The process 1200 may have a complementary process executed by devices such as mobile device 110.

As shown, the process may receive (at 1210) one or more event notifications from mobile devices 110. As described above, a two-part verification process may be used by some embodiments. Such embodiments may include additional messages related to identity validation as described above.

Next, the process may decrypt (at 1220) each received notification and extract the information included in the notification message.

Process 1200 may then perform (at 1230) summary node mapping. Summary node mapping will be described in more detail in reference to process 1300 below.

The process may then perform (at 1240) feature analysis. Next, the process may provide (at 1250) multi-resolution analysis and then may end. Feature analysis and multi-resolution analysis will be described in more detail in reference to process 1400 below.

Figure 13:
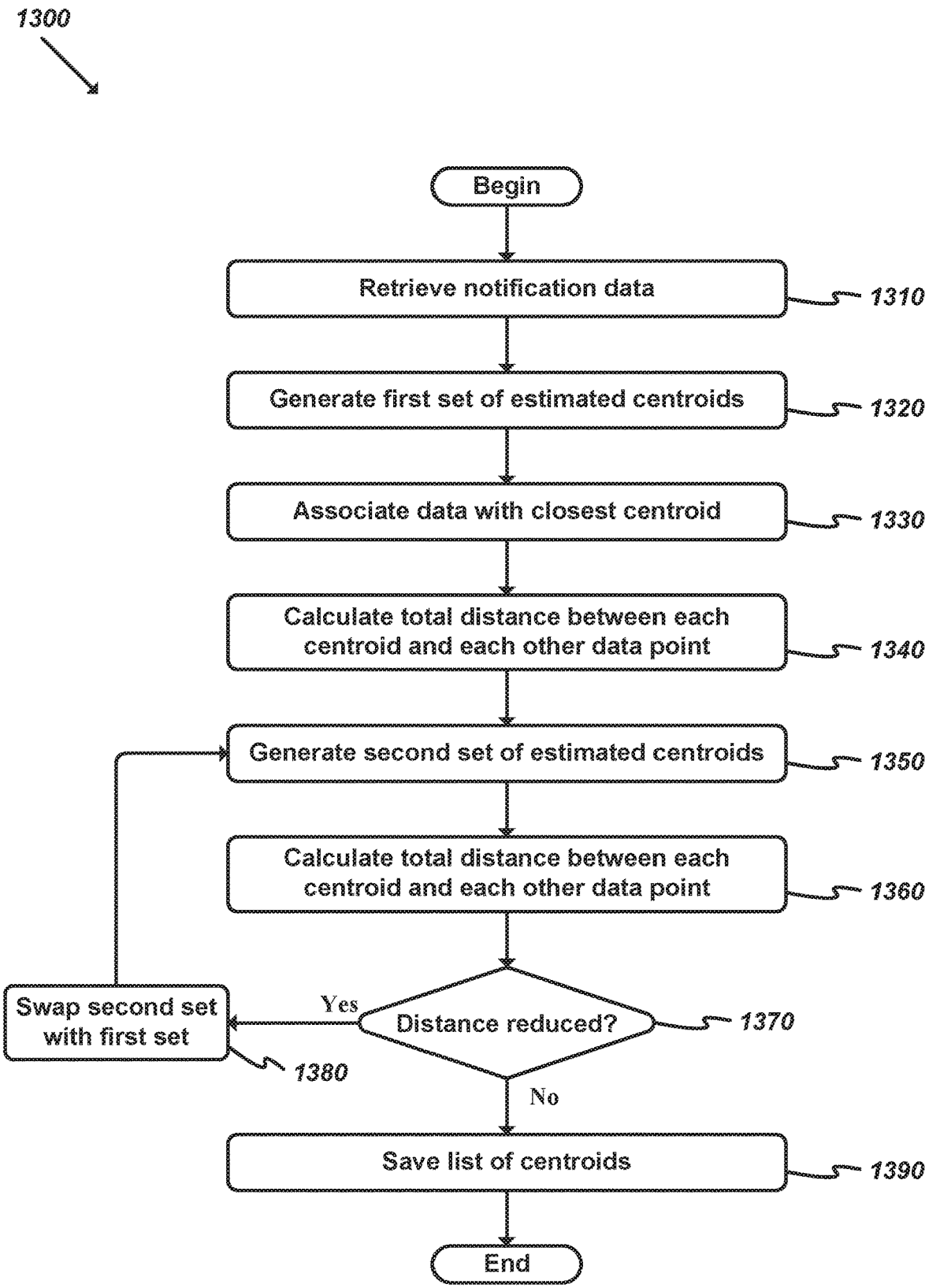
FIG. 13 illustrates a flow chart of an exemplary process that generates a set of summary nodes based on collected notification data.

FIG. 13 illustrates a flow chart of an exemplary process 1300 that generates a set of summary nodes based on collected notification data. Such a process may begin, for instance, when a server of some embodiments is powered on, when an application is launched, and/or under other appropriate conditions. The process may be executed by an element such as server 120.

The process may utilize k-medoid clustering, which is very fast and supports algorithms that improve the ability to choose nearly optimal medoids. The k-medoids are useful in selecting summary nodes that represent summarized activity of clusters of nodes in a populated area. The summarization of the nodes preserves the anonymity and privacy of the mobile devices sourcing the data.

As shown, the process may retrieve (at 1310) notification data. Such data may be associated with many user devices 110. The data may be retrieved or received in real time (or near real time), or may be stored for future analysis.

Next, the process may generate (at 1320) a first set of estimated centroids. Such centroids may be randomly selected or placed, as described above in reference to FIG. 4A.

Process 1300 may then associate (at 1330) each data point with the closest centroid. Such association may be similar to that described above in reference to FIG. 4B.

The process may then calculate (at 1340) total distance between each centroid and each associated data point. Each distance may be calculated as the straight-line distance between the particular data point and the particular centroid.

Next, the process may generate (at 1350) a second set of estimated centroids and associate each data point with the closest centroid. The second set of centroids may be randomly selected or placed, as described above in reference to FIG. 4C.

The process may then calculate (at 1360) total distance between each centroid and each associated data point. Next, process 1300 may determine (at 1370) whether the total distance was reduced from the first set of centroids to the second set of centroids.

If the process determines (at 1370) that the total distance was reduced, the process may swap (at 1380) the second set of centroids with the first set of centroids (i.e., the second set becomes the first set) and generate (at 1350) another second set of centroids. Operations 1350-1380 may be repeated until the process determines (at 1370) that the distance was not reduced.

If the process determines (at 1370) that the total distance was not reduced, the process may save (at 1390) a list including the current "first" set of centroids and then may end.

Figure 14:
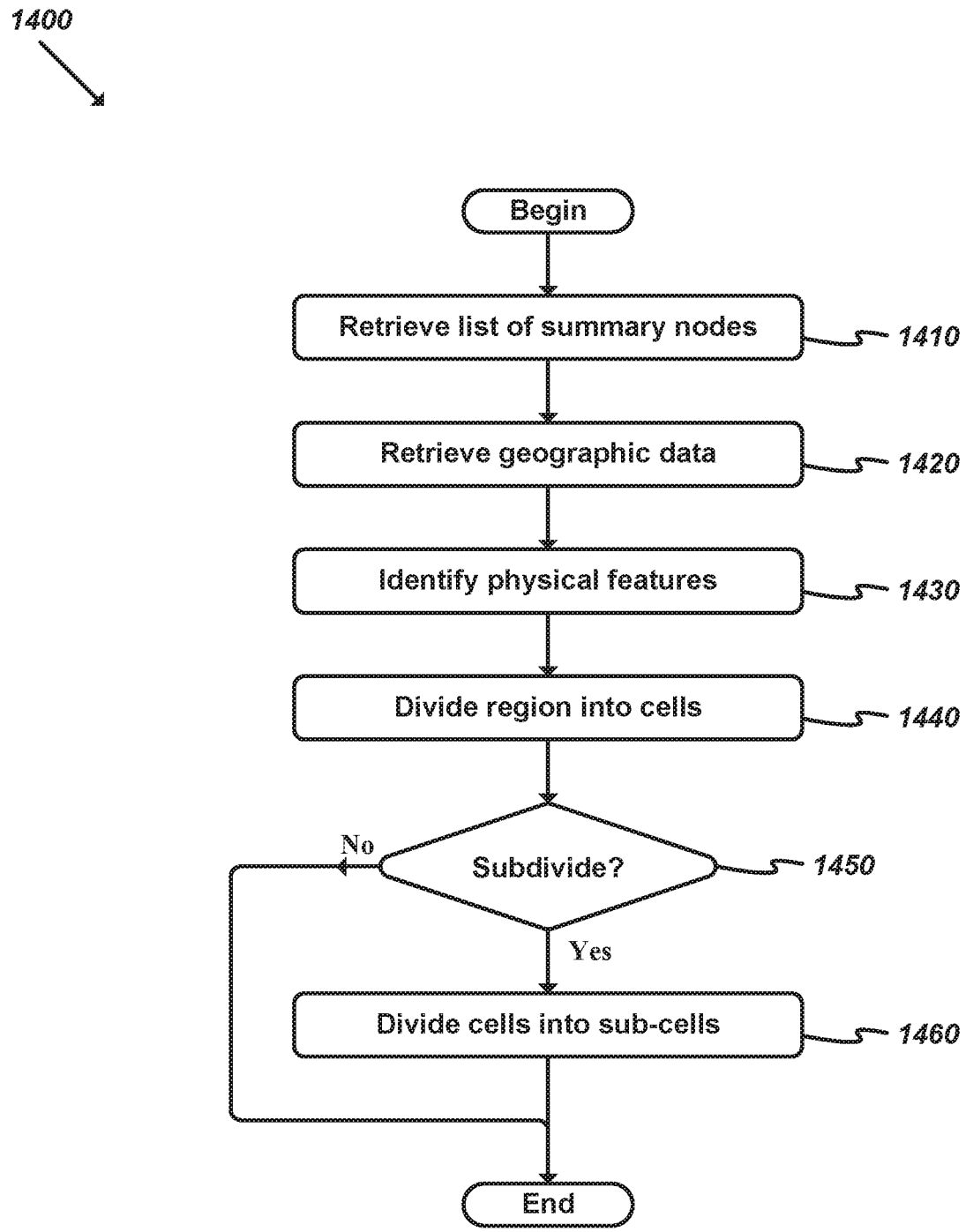
FIG. 14 illustrates a flow chart of an exemplary process that divides regions into cells and identifies physical features of the region.

FIG. 14 illustrates a flow chart of an exemplary process 1400 that divides regions into cells and identifies physical features of the region. Such a process may begin, for instance, when a set of summary nodes has been generated, such as using process 1300. Process 1400 may be executed by an element such as server 120.

As shown, process 1400 may retrieve (at 1410) a list of summary nodes associated with a region. The process may further retrieve or generate reports associated with multiple summary nodes.

Next, the process may retrieve (at 1420) geographic or other external data, if available. Such data may include map data, structure locations, etc. Alternatively, some embodiments may not utilize external data.

The process may then identify (at 1430) physical features associated with the region. Such identification may use the retrieved geographic data, if available. Alternatively, the summary node information may be analyzed to identify features such as geographic features, roadways, buildings, etc. Such features (and representations thereof) were described above in reference to FIG. 7. Such features may include various shapes such as curves, ellipses, rectangles, etc. that may be overlaid onto roadways, waterways, malls, stadiums, shorelines, buildings, etc. Such feature-based classification provides information useful in identifying environmental or physical phenomena taking place across a set of mobile devices 110.

Process 1400 may then divide (at 1440) the region into cells. Such division may be based on the latitude-longitude positions associated with the summary nodes or reports. In some embodiments, the cell locations may be pre-defined (e.g., based on map data, based on a specified region of interest, etc.). Other embodiments may determine a number of cells based on the positions of the nodes, clustering of nodes, number of total nodes, etc.

Like summary nodes, grid cells abstract away actual device position and promote anonymity and privacy. Grid cells also provide rapid ways of clustering data points for downstream statistical summarization at a cell level. Such grid cells were described in more detail in reference to FIG. 5, FIG. 6, and FIG. 7 above. In FIG. 5, element 510 may represent reports provided by summary nodes. These summarized reports may include an abstracted latitude-longitude position. Such latitude-longitude positions are represented by cells 520 and 610.

Next, the process may determine (at 1450) whether any cells should be subdivided. Such a determination may be made based on various appropriate factors (e.g., number of nodes in a cell, number of user devices associated with a cell, distance between nodes, etc.). If the process determines (at 1450) that no cells should be subdivided, the process may end.

In cases where there are a large number of reports, multi-resolution grids, or multi-grids allow more populous grid cells to sub-divide in the case of event storms. If the process determines (at 1450) that one or more cells should be subdivided, the process may divide (at 1460) the cells into sub-cells and then may end. Some embodiments may continue evaluating sub-cells for further division until some criteria is reached (e.g., maximum number of nodes or reports in any single sub-cell). The use of these multi-resolution grid-cells allows efficient scaling of grid-based information to cover large regions including highly populated areas.

Figure 15:
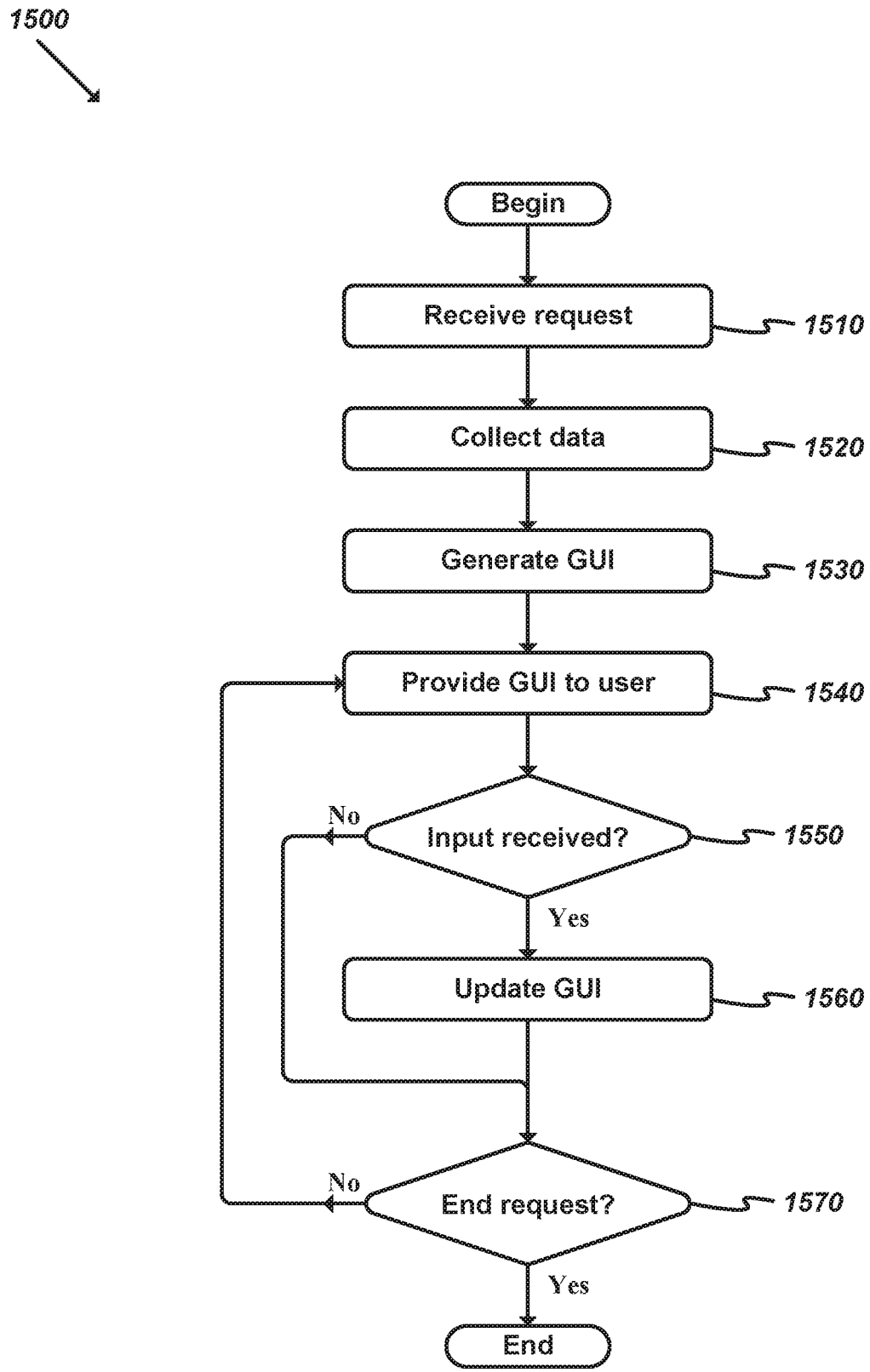
FIG. 15 illustrates a flow chart of an exemplary process that generates crowd-sourced analytics reports and provides the reports to a user.

FIG. 15 illustrates a flow chart of an exemplary process 1500 that generates crowd-sourced analytics reports and provides the reports to an administrative user. Such a process may begin, for instance, when an application of some embodiments is launched. The process may be executed by an element such as server 120. The process 1500 may have a complementary process executed by devices such as mobile device 110.

As shown, the process may receive (at 1510) a request for data. Such a request may include various elements, such as a region or location, set of structures, attributes of user devices, etc. Next, the process may collect (at 1520) the data. Such data may include, for instance, summary node information (including grid position), physical features, geographic features, cell information, sub-cell information, etc.

Next, the process may generate (at 1530) a graphical user interface (GUI) for provision of the collected data. In some embodiments, the generated GUI may be similar to chart 900.

Process 1500 may then provide (at 1540) the GUI to a user. The GUI may be provided via a user device application, a web application, and/or other appropriate ways.

Next, the process may determine (at 1550) whether any input has been received. Such inputs may include changes to data selection criteria, selection of sub-cells, scroll, zoom, and/or other appropriate actions.

If the process determines (at 1550) that an input has been received, the process may update (at 1560) the GUI based on the received input. After updating (at 1560) the GUI or determining (at 1550) that no input was received, the process may determine (at 1570) whether an end session request has been received. Alternatively, some other end session criteria may be used (e.g., time elapsed since last received input). If the process determines that no such request has been received, the process may repeat operations 1540-1570 until the process determines (at 1570) that an end session request has been received and then the process may end.

One of ordinary skill in the art will recognize that processes 1000, 1100, 1200, 1300, 1400, and 1500 may be implemented in various different ways in different embodiments without departing from the scope of the disclosure. For instance, the operations may be performed in different orders than shown. As another example, additional operations may be included and/or various listed operations may be omitted. Some processes, or portions thereof, may be performed iteratively and/or based on some performance criteria. The processes may be divided into sub-processes and/or combined into macro processes.

IV. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 16:
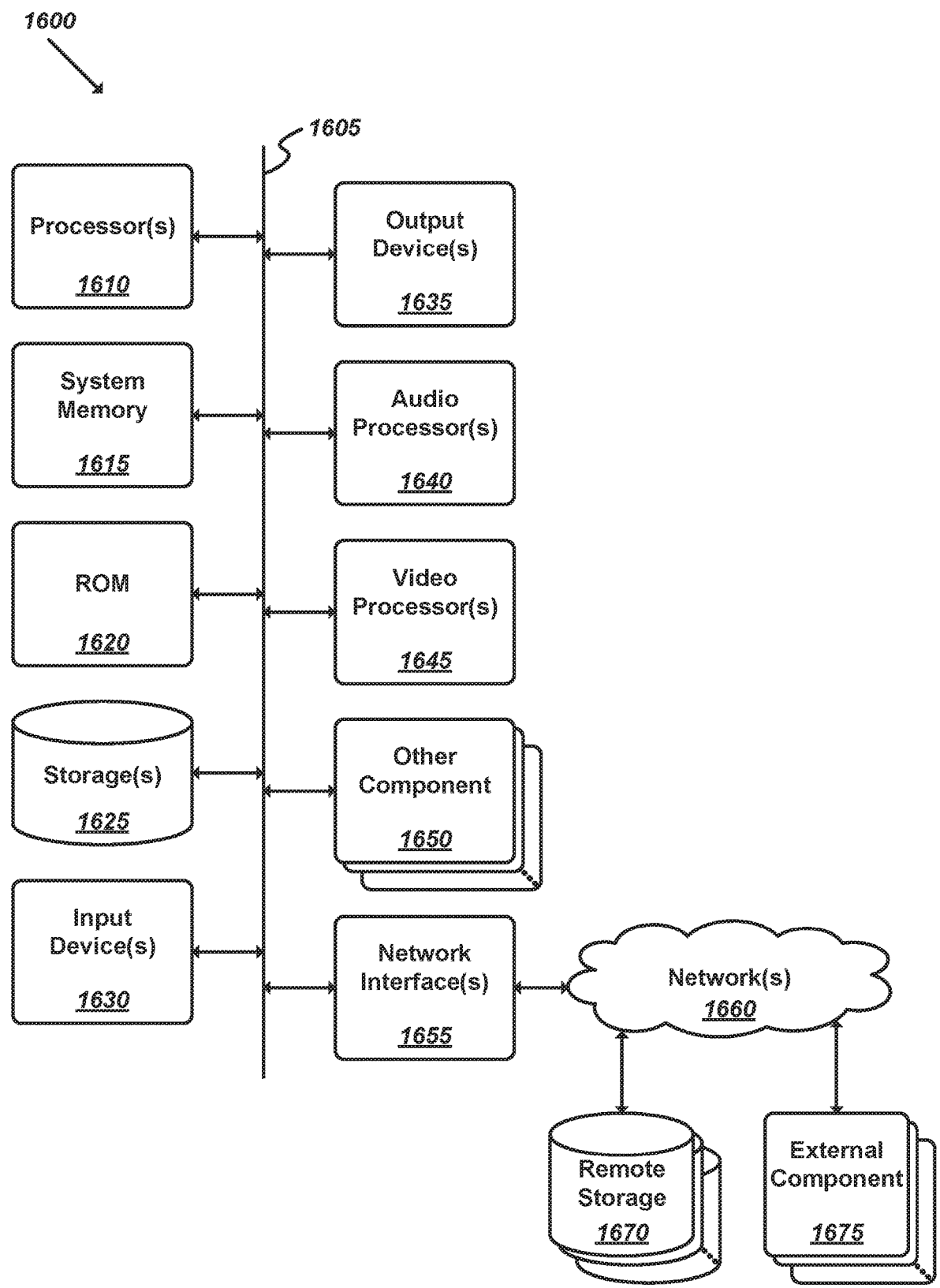
FIG. 16 illustrates a schematic block diagram of an exemplary computer system used to implement some embodiments.

FIG. 16 illustrates a schematic block diagram of an exemplary computer system 1600 used to implement some embodiments. For example, the system described above in reference to FIG. 1 and FIG. 2 may be at least partially implemented using computer system 1600. As another example, the processes described in reference to FIG. 10-15 may be at least partially implemented using sets of instructions that are executed using computer system 1600.

Computer system 1600 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1600 may include at least one communication bus 1605, one or more processors 1610, a system memory 1615, a read-only memory (ROM) 1620, permanent storage devices 1625, input devices 1630, output devices 1635, audio processors 1640, video processors 1645, various other components 1650, and one or more network interfaces 1655.

Bus 1605 represents all communication pathways among the elements of computer system 1600. Such pathways may include wired, wireless, optical, and/or other appropriate communication pathways. For example, input devices 1630 and/or output devices 1635 may be coupled to the system 1600 using a wireless connection protocol or system.

The processor 1610 may, in order to execute the processes of some embodiments, retrieve instructions to execute and/or data to process from components such as system memory 1615, ROM 1620, and permanent storage device 1625. Such instructions and data may be passed over bus 1605.

System memory 1615 may be a volatile read-and-write memory, such as a random access memory (RAM). The system memory may store some of the instructions and data that the processor uses at runtime. The sets of instructions and/or data used to implement some embodiments may be stored in the system memory 1615, the permanent storage device 1625, and/or the read-only memory 1620. ROM 1620 may store static data and instructions that may be used by processor 1610 and/or other elements of the computer system.

Permanent storage device 1625 may be a read-and-write memory device. The permanent storage device may be a non-volatile memory unit that stores instructions and data even when computer system 1600 is off or unpowered. Computer system 1600 may use a removable storage device and/or a remote storage device as the permanent storage device.

Input devices 1630 may enable a user to communicate information to the computer system and/or manipulate various operations of the system. The input devices may include keyboards, cursor control devices, audio input devices and/or video input devices. Output devices 1635 may include printers, displays, audio devices, etc. Some or all of the input and/or output devices may be wirelessly or optically connected to the computer system 1600.

Audio processor 1640 may process and/or generate audio data and/or instructions. The audio processor may be able to receive audio data from an input device 1630 such as a microphone. The audio processor 1640 may be able to provide audio data to output devices 1640 such as a set of speakers. The audio data may include digital information and/or analog signals. The audio processor 1640 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 1645 (or graphics processing unit) may process and/or generate video data and/or instructions. The video processor may be able to receive video data from an input device 1630 such as a camera. The video processor 1645 may be able to provide video data to an output device 1640 such as a display. The video data may include digital information and/or analog signals. The video processor 1645 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 1650 may perform various other functions including providing storage, interfacing with external systems or components, etc.

Finally, as shown in FIG. 16, computer system 1600 may include one or more network interfaces 1655 that are able to connect to one or more networks 1660. For example, computer system 1600 may be coupled to a web server on the Internet such that a web browser executing on computer system 1600 may interact with the web server as a user interacts with an interface that operates in the web browser. Computer system 1600 may be able to access one or more remote storages 1670 and one or more external components 1675 through the network interface 1655 and network 1660. The network interface(s) 1655 may include one or more application programming interfaces (APIs) that may allow the computer system 1600 to access remote systems and/or storages and also may allow remote systems and/or storages to access computer system 1600 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1600 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

We claim:

1. An automated method that generates crowd-sourced event notifications, the method comprising:
   retrieving sensor data at a plurality of mobile devices;
   detecting and processing, at each of the plurality of mobile devices, a plurality of events based on the retrieved sensor data;
   receiving, at an identity server, an identification message from each mobile device in the plurality of mobile devices, each identification message comprising key;
   receiving, at an analytics server, a notification message from each mobile device in the plurality of mobile devices, the notification message comprising processed sensor data for multiple events from the plurality of events, the notification message encrypted using the key associated with each mobile device;
   receiving, at the analytics server, the key from the identity server;
   decrypting, at the analytics server, the notification message using the key associated with each mobile device;
   generating, at the analytics server, a set of summary nodes based at least partly on the notification messages, wherein each summary node in the set of summary nodes is associated with multiple notification messages;
   associating each node in the set of summary nodes with a geographic location;
   generating a set of equally sized non-overlapping cells that span the geographic location; and
   subdividing any cell from the set of equally sized cells that includes a number of summary nodes that exceeds a specified threshold.

2. The automated method of claim 1, wherein detecting a plurality of events comprises:
   calculating at least one statistical value comprising at least one of moving average, rate of change, minimum, and maximum;
   comparing the at least one statistical value to at least one threshold; and
   identifying a particular event from the plurality of events if the at least one statistical value exceeds the at least one threshold.

3. The automated method of claim 1, wherein generating the set of summary nodes comprises, iteratively:
   generating a first set of estimated medoids;

associating each event from the plurality of events with a closest medoid from the first set of estimated medoids;

calculating a first total distance between each medoid from the first set of estimated medoids and each associated event;

generating a second set of estimated medoids;

associating each event from the plurality of events with the closest medoid from the second set of estimated medoids;

calculating a second total distance between each medoid from the second set of estimated medoids and each associated event; and exchanging the first set of medoids with the second set of estimated medoids if the second total distance is less than the first total distance.

4. The automated method of claim 1 further comprising:

analyzing locations of summary nodes in the set of summary nodes;

determining, based on the analyzing, that the locations of the summary nodes indicate at least one geographic feature; and generating a representation of the at least one geographic feature, wherein the at least one geographic feature comprises at least one of a shoreline, structure, barrier, roadway, and waterway.

5. The automated method of claim 1 further comprising providing a graphical user interface comprising:

a chart including a plurality of geographic features;

a set of cells overlaid onto the chart; and the set of summary nodes positioned on the chart relative to the set of cells and the plurality of geographic features.

* * * * *